United States Patent
Aikoh et al.

(10) Patent No.: US 7,196,975 B1
(45) Date of Patent: Mar. 27, 2007

(54) MAGNETO-OPTICAL DISK WITH PROTECTIVE LAYER, AND OPTICAL DISK DEVICE

(75) Inventors: Hideki Aikoh, Higashiosaka (JP); Tohru Nakamura, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 237 days.

(21) Appl. No.: 10/089,409

(22) PCT Filed: Nov. 6, 2000

(86) PCT No.: PCT/JP00/07796

§ 371 (c)(1),
(2), (4) Date: Mar. 28, 2002

(87) PCT Pub. No.: WO01/37274

PCT Pub. Date: May 25, 2001

(30) Foreign Application Priority Data

Nov. 12, 1999 (JP) ............................. 11-323315

(51) Int. Cl.
*G11B 11/00* (2006.01)
(52) U.S. Cl. .................... 369/13.12; 369/13.21
(58) Field of Classification Search ........... 369/13.12, 369/13.38, 13.21, 13.2, 13.36, 13.35, 13.39, 369/13.4, 275.2, 275.3, 13.55; 428/69.3, 428/694 ML
See application file for complete search history.

(56) References Cited

U.S. PATENT DOCUMENTS

| | | | |
|---|---|---|---|
| 5,309,421 A | | 5/1994 | Fujisawa |
| 5,527,479 A | * | 6/1996 | Nagataki et al. ............ 508/205 |
| 5,540,988 A | * | 7/1996 | Tachibana et al. .......... 428/323 |
| 5,568,466 A | * | 10/1996 | Komaki et al. .......... 369/13.35 |
| 5,608,717 A | * | 3/1997 | Ito et al. .................. 369/275.3 |
| 5,608,718 A | * | 3/1997 | Schiewe .................. 369/275.4 |
| 5,663,211 A | * | 9/1997 | Kominami et al. ............ 522/8 |
| 5,748,607 A | * | 5/1998 | Ohira et al. ............. 369/275.4 |
| 5,764,619 A | * | 6/1998 | Nishiuchi et al. ........ 369/275.1 |
| 5,904,969 A | * | 5/1999 | Kamezaki et al. ....... 369/275.4 |
| 5,912,061 A | | 6/1999 | Uchida et al. |
| 5,959,948 A | | 9/1999 | Oshima |
| 6,044,043 A | * | 3/2000 | Aoki et al. ................ 369/13.2 |
| 6,333,900 B1 | * | 12/2001 | Maro et al. .............. 369/13.17 |
| 6,625,107 B2 | * | 9/2003 | Kawano .................. 369/13.35 |

FOREIGN PATENT DOCUMENTS

EP 0 473 305 3/1992

(Continued)

*Primary Examiner*—Tan Dinh
(74) *Attorney, Agent, or Firm*—Hamre, Schumann, Mueller & Larson, P.C.

(57) ABSTRACT

On a pit information surface (22*d*) of a read-only optical disk (22), a protective layer (22*f*) suited for a floating-type or a sliding-type magnetic head (3) used for a magnetic field modulation type magneto-optical disk is formed. A reproducing operation with respect to the optical disk (22) is performed while allowing the magnetic head (3) to slide on the protective layer (22*f*). Accordingly, a magnetic head does not need to be separated from a disk in reproduction. Thus, an optical disk device can be manufactured at lower cost and reduced in size, and a high-speed seek can be realized. Commonality of a disk cartridge (32) with the magnetic field modulation type magneto-optical disk also can be achieved. An optical disk system that is user-friendly thus can be obtained.

24 Claims, 3 Drawing Sheets

FOREIGN PATENT DOCUMENTS

| | | | |
|---|---|---|---|
| EP | 0 586 990 | | 3/1994 |
| EP | 0 863 503 | | 9/1998 |
| EP | 0 974 965 | | 1/2000 |
| EP | 1 067 519 | | 1/2001 |
| JP | 63-113992 | | 5/1988 |
| JP | 1-282757 | | 11/1989 |
| JP | 2-239440 | | 9/1990 |
| JP | 3-125352 | * | 5/1991 .............. 369/13.38 |
| JP | 3-157837 A | * | 7/1991 .............. 369/13.38 |
| JP | 4-103079 | | 4/1992 |
| JP | 5-36234 | | 2/1993 |
| JP | 5-89523 | | 4/1993 |
| JP | 5-274739 | | 10/1993 |
| JP | 5-342684 | | 12/1993 |
| JP | 6-139737 | | 5/1994 |
| JP | 7-044912 | * | 2/1995 .............. 369/13.35 |
| JP | 10-308036 | * | 11/1998 ................ 369/274 |
| JP | 2001-6210 | | 1/2001 |

\* cited by examiner

FIG.3A
(Prior Art)
FIG.3B
(Prior Art)
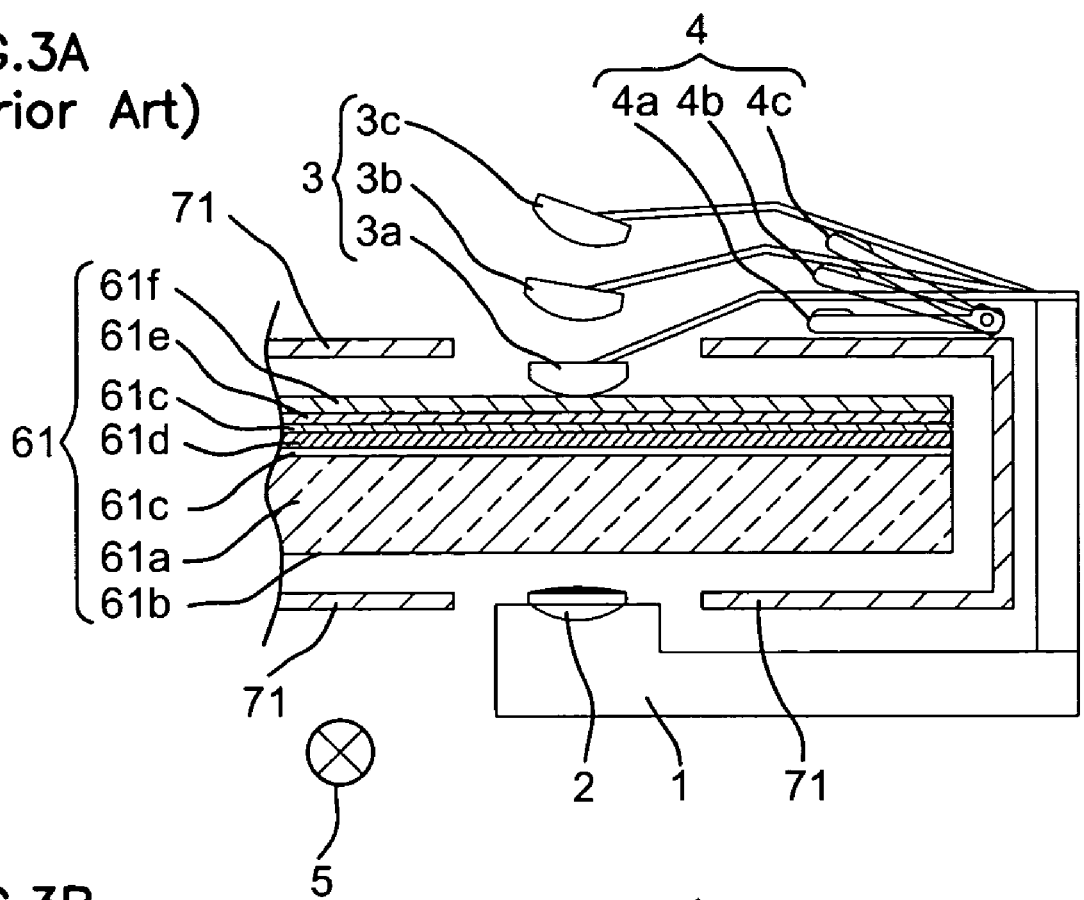
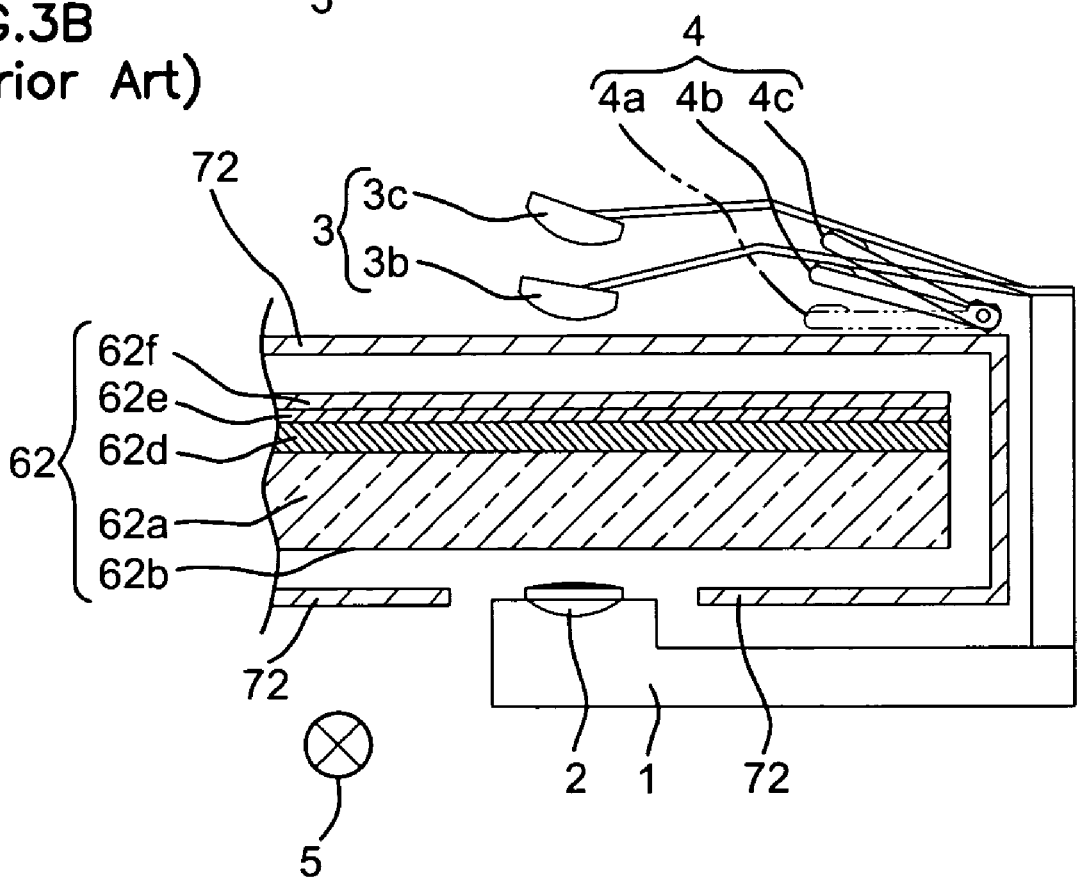

MAGNETO-OPTICAL DISK WITH PROTECTIVE LAYER, AND OPTICAL DISK DEVICE

This application is a 371 of PCT/JP00/07796 Nov. 06, 2000.

TECHNICAL FIELD

The present invention relates to an optical disk that allows information to be recorded and/or reproduced using an optical means and an optical disk device that can record information on and/or reproduce recorded information from the optical disk.

BACKGROUND ART

In the current age of information, high-density and large-capacity memories have been developed with growing enthusiasm. Memories are required to have not only the capability of high-density, large-capacity and highly reliable storage, but also the capability of rewriting or the like. It is an optical disk that is known to satisfy these requirements.

Conventionally, in relation to an optical disk and an optical disk device for performing recording and reproduction with respect to the optical disk, for example, a CD, a MD, and a DVD have been commercialized, and many reports on relevant technologies have been made. Particularly, as an optical disk system including a magnetic field modulation type magneto-optical disk and a read-only disk that allows reproduction to be performed so that compatibility with the magnetic field modulation type magneto-optical disk is attained, a minidisk (a MD) and a driving device used for the minidisk have created a market.

Hereinafter, conventional minidisks (MD5) and a conventional driving device used for the minidisks will be described with reference to the appended drawings.

FIGS. 3A and 3B are cross sectional views schematically showing the configurations of optical disks in the form of a MD and an optical head and a magnetic head in an optical disk device for performing recording and reproduction with respect to the MDs. The following description is directed to the configurations and operations of the MDs, the optical head, and the magnetic head.

In FIG. 3A, reference characters 61 and 71 denote a recordable minidisk (hereinafter, referred to as a MD-PA and an optical disk cartridge housing the MD-RAM 61, respectively. In FIG. 3B, reference characters 62 and 72 denote a read-only minidisk (hereinafter, referred to as a MD-ROM) and an optical disk cartridge housing the MD-ROM 62, respectively.

In the MD-RAM 61 shown in FIG. 3A, reference characters 61a and 61c denote an optical disk substrate for transmitting a light beam that has passed through a light incidence surface 61b, which is formed of a transparent polycarbonate resin having a thickness of 1.2 mm, and a dielectric film that gives the effect of allowing optical enhancement to be attained, respectively. Further, reference characters 61d, 61e, and 61f denote a magneto-optical recording surface obtained by providing a magneto-optical recording medium mainly containing terbium, iron, cobalt, or the like on a surface to be irradiated with a light beam transmitted via the substrate 61a, a reflective film mainly containing aluminum, and a protective layer formed of an ultraviolet curable resin, respectively.

In the figure, reference characters 1, 2, and 3 denote an optical head having a light emitting part and a light receiving part, an objective lens mounted on the optical head 1, which focuses a light beam emitted from the light emitting part on the magneto-optical recording surface 61d, and a sliding-type magnetic head that is of a magnetic field modulation type, respectively. Further, reference character 4 denotes a lifter mechanism for regulating a positional relationship, i.e. spacing, between the magnetic head 3 and the MD-RAM 61. The optical disk 1, the objective lens 2, and the magnetic head 3 are allowed to move (seek) as a unit in a radial direction (a direction perpendicular to a plane on which the figure is drawn) 5 of the MD-RAM 61.

The optical disk cartridge 71 has openings on a side of the magnetic head 3 as well as a side of the optical head 1, each of which has a shutter (not shown) that can be opened and closed.

The magnetic head 3 and the lifter mechanism 4 are operated in the following three operation modes.

In the figure, reference character 3a denotes a recording mode for the magnetic head 3. In the recording mode 3a, the magnetic head 3 that has been inserted through one of the openings of the optical disk cartridge 71 is sliding on the protective layer 61f of the MD-RAM 61. This operation requires a sliding member (a member to be brought into contact with the MD-RAM 61, not shown) of the magnetic head 3 to have sliding characteristics in which importance is placed on abrasion resistance or the like. The protective layer 61f also has a composition in which importance is placed on the sliding characteristics. For example, the protective layer 61f is coated with a silicone oil (such as polydimethyl silicone). Further, reference character 4a denotes a recording mode for the lifter mechanism 4 in which the magnetic head 3 is put into the recording mode 3a by the lifter mechanism 4. In the recording mode 4a, the lifter mechanism 4 is out of contact with the magnetic head 3.

In the figure, reference character 3b denotes a reproducing mode for the magnetic head 3. In the reproducing mode 3b, the magnetic head 3 is held so that a given spacing is provided between the magnetic head 3 and the protective layer 61f of the MD-RAM 61. Further, reference character 4b denotes a reproducing mode for the lifter mechanism 4 in which the magnetic head 3 is put into the reproducing mode 3b by the lifter mechanism 4. In the reproducing mode 4b, the lifter mechanism 4 is in contact with the magnetic head 3 to lift the magnetic head 3 to a predetermined level.

In the figure, reference character 3c denotes a mode (a cartridge insertion mode) for the magnetic head 3 in which the optical disk cartridge 71 housing the MD-RAM 61 is inserted into the optical disk device to be mounted in a mechanism (not shown). In the cartridge insertion mode 3c, the magnetic head 3 is held (retracted) so that a given spacing is provided between the magnetic head 3 and the optical disk cartridge 71 to avoid interference between them. Further, reference character 4c denotes a cartridge insertion mode for the lifter mechanism 4 in which the magnetic head 3 is put into the cartridge insertion mode 3c by the lifter mechanism 4. In the cartridge insertion mode 4c, the lifter mechanism 4 is in contact with the magnetic head 3 to lift the magnetic head 3 to a level higher than that in the reproducing mode 3b.

In the MD-ROM 62 shown in FIG. 3B, reference character 62a denotes an optical disk substrate for transmitting a light beam that has passed through a light incidence surface 62b, which is formed of a transparent polycarbonate resin having a thickness of 1.2 mm. Further, reference characters 62d, 62e, and 62f denote a pit information surface formed on a surface to be irradiated with a light beam transmitted via the substrate 62a, a reflective film mainly containing aluminum, and a protective layer formed of an ultraviolet curable resin, respectively.

In the figure, as in the case of the MD-RAM 61 shown in FIG. 3A, reference characters 1, 2, and 3 denote an optical head, an objective lens, and a magnetic head, respectively. Further, reference character 4 denotes a lifter mechanism for regulating a positional relationship, i.e. spacing between the magnetic head 3 and the MD-ROM 62. The optical head 1, the objective lens 2, the magnetic head 3, and the lifter mechanism 4 are the same components as those of the optical disk device used in the case of the MD-RAM 61. The optical disk 1, the objective lens 2, and the magnetic head 3 are allowed to move (seek) as a unit in a radial direction (the direction perpendicular to the plane on which the figure is drawn) 5 of the MD-ROM 62.

Since the MD-ROM 62 is a read-only optical disk, the operation modes of the magnetic head 3 and the lifter mechanism 4 do not include the following modes described with reference to the MD-RAM 61 shown in FIG. 3A: the recording mode 3a in which the magnetic head 3 is sliding on the protective layer 61f of the MD-RAM 61; and the recording mode 4a for the lifter mechanism 4 in which the magnetic head 3 is put into the recording mode 3a by the lifter mechanism 4. In terms of the mechanism of the optical disk device, there is no difference between the cases shown in FIGS. 3A and 3B, and thus it is possible to put the lifter mechanism 4 into the recording mode 4a. However, the optical disk device is set so that the lifter mechanism 4 is not operated in the recording mode 4a when the MD-ROM 62 is mounted in the optical disk device.

Accordingly, the optical disk cartridge 72 is structured to have an opening only on a side of the optical head 1, which has a shutter (not shown) that can be opened and closed, and not to have an opening on a side of the magnetic head 3.

In addition, since the recording mode 3a is not included in the operation modes for the magnetic head 3, it is not required at all that the protective layer 62f of the MD-ROM 62 has a composition in which importance is placed on the sliding characteristics as in the case of the protective layer 61f of the MD-RAM 61.

In FIG. 3B, reference character 3b denotes a reproducing mode for the magnetic head 3. In the reproducing mode 3b, the magnetic head 3 is held so that a given spacing is provided between the magnetic head 3 and the optical disk cartridge 72 as well as the protective layer 62f of the MD-ROM 62. Further, reference character 4b denotes a reproducing mode for the lifter mechanism 4 in which the magnetic head 3 is put into the reproducing mode 3b by the lifter mechanism 4. In the reproducing mode 4b, the lifter mechanism 4 is in contact with the magnetic head 3 to lift the magnetic head 3 to a predetermined level.

In the figure, reference character 3c denotes a mode (a cartridge insertion mode) for the magnetic head 3 in which the optical disk cartridge 72 housing the MD-ROM 62 is inserted into the optical disk device to be mounted in a mechanism (not shown). In the cartridge insertion mode 3c, the magnetic head 3 is held (retracted) so that a given spacing is provided between the magnetic head 3 and the optical disk cartridge 72 to avoid interference between them. Further, reference character 4c denotes a cartridge insertion mode for the lifter mechanism 4 in which the magnetic head 3 is put into the cartridge insertion mode 3c by the lifter mechanism 4. In the cartridge insertion mode 4c, the lifter mechanism 4 is in contact with the magnetic head 3 to lift the magnetic head 3 to a level higher than that in the reproducing mode 3b.

The following description is directed to recording and reproducing operations of the MDs.

In the recording operation for the MD-RAM 61, as shown in FIG. 3A, the magnetic head 3 is put into the recording mode 3a. Then, a modulated magnetic field is applied from the magnetic head 3 to the magneto-optical recording surface 61d based on a modulating signal, and DC (direct current) light of a relatively high power level is emitted from the optical head 1, so that a minute beam spot is formed on the magneto-optical recording surface 61d using the objective lens 2. This allows a magneto-optical information signal to be recorded by a so-called magnetic field modulation recording method.

In the reproducing operation for the MD-RAM 61, the magnetic head 3 is put into the reproducing mode 3b. Then, while the magnetic head 3 is not energized, DC (direct current) light of a relatively low power level is emitted from the optical head 1, so that a minute beam spot is formed on the magneto-optical recording surface 61d using the objective lens 2. This allows the light beam reflected from the magneto-optical recording surface 61d to be reproduced as a magneto-optical information signal due to the so-called Kerr effect.

In the reproducing operation of the MD-ROM 62, as shown in FIG. 3B, the magnetic head 3 is put into the reproducing mode 3b. Then, while the magnetic head 3 is not energized, DC (direct current) light of a relatively low power level is emitted from the optical head 1, so that a minute beam spot is formed on the pit information surface 62d using the objective lens 2. This allows the light beam reflected from the pit information surface 62d to be reproduced as a pit information signal obtained by detecting the presence or absence of a pit based on the so-called variation in intensity of the light beam.

As described above, the recording and reproducing operations with respect to the MD-RAM 61 and the reproducing operation with respect to the MD-ROM 62 can be performed by the same optical disk device.

In the above description, other components of the optical disk device such as a motor, a circuit, and a disk loading and holding mechanism are not described nor shown in the figures since they are not related directly to the present invention.

The aforementioned configurations of the conventional MDs and the conventional optical disk device have presented the following problems.

In the optical disk device used for the MD-RAM 61 and the MD-ROM 62 shown in FIG. 3, it is required that the lifter mechanism 4 be operated in three operation modes, i.e. the recording mode 4a, the reproducing mode 4b, and the cartridge insertion mode 4c. This has led to the problems of a complicated mechanism design, an increased number of components, more room required for the lifter mechanism 4, and a complicated system control. Generally, it results in an increase in manufacturing cost to develop measures directed to the aforementioned problems to provide an optical disk device for performing recording and reproduction with respect to a compact MD, which has been disadvantageous.

Furthermore, the aforementioned configurations also have presented the following problem. When reproduction is performed with respect to the MD-RAM 61 and the MD-ROM 62, the lifter mechanism 4 is put into the reproducing mode 4b. In the reproducing mode 4b, the lifter mechanism 4 is in contact with the magnetic head 3 to lift the magnetic head 3, and thus the optical head 1 hardly can perform a seeking operation at a high speed in the disk radial direction 5. In the seeking operation performed in reproduction, it is required that the magnetic head 3 slide on the lifter mechanism 4. However, in a state where two components are moving relative to each other while being mechanically in contact with each other, mechanism resonance, vibration caused by external disturbances, stick-slip, and the like are caused to affect even a servo signal of the objective lens 2. This has led to a problem of difficulty in realizing a high-speed seeking operation. On the other hand, when recording is performed with respect to the MD-RAM 61, the lifter mechanism 4 is out of contact with the magnetic head 3, and thus the aforementioned problem does not arise in a seeking operation performed in recording. Instead, the magnetic head 3 is brought to a state of simply sliding on the protective layer 61f under a condition of considerably high sliding characteristics.

Moreover, when an optical disk device (a drive) is configured so as to be adaptable to a partially recorded optical disk (a partial ROM) that even meets the MD Standards, controlling of the lifter mechanism 4 becomes more complicated, and the technical problem of the difficulty in realizing the high-speed seeking operation becomes more serious.

In addition, as shown in FIG. 3, while the optical disk cartridge 71 for the MD-RAM 61 is structured so as to have the openings and the shutters on the side of the magnetic head 3 as well as the side of the optical head 1, the optical disk cartridge 72 for the MD-ROM 62 is structured so as to have the opening and the shutter only on the side of the optical head 1 and not to have the opening and the shutter on the side of the magnetic head 3. This has led to a major problem of the difficulty in achieving commonality between the optical disk cartridge 71 and the optical disk cartridge 72.

DISCLOSURE OF THE INVENTION

The present invention is to provide an optical disk and an optical disk device for performing recording and reproduction with respect to the optical disk, which allow an optical disk device to be manufactured at lower cost and reduced in size mainly by improving the configuration of a lifter mechanism, improve the performance of the optical disk device by enhancing realization of a high-speed seek, and allow commonality of a disk cartridge to be achieved, thus being user-friendly.

In order to achieve the aforementioned objects, the present invention is characterized by the following configuration.

An optical disk of a first configuration according to the present invention is a read-only optical disk including an optical disk substrate of a predetermined thickness having a light incidence surface on one face, in which at least a pit information surface and a protective layer are formed in this order on a side of the other face opposed to the light incidence surface. The protective layer is a protective layer suited for a floating-type magnetic head used for a magnetic field modulation type magneto-optical disk or a protective layer suited for a sliding-type magnetic head used for the magnetic field modulation type magneto-optical disk. According to this configuration, since the protective layer suited for the floating-type or the sliding type magnetic head is provided on the face opposed to the light incidence surface, a read-only optical disk can be obtained that allows the floating-type or the sliding-type magnetic head used for the magnetic field modulation type magneto-optical disk to be operated.

Furthermore, an optical disk of a second configuration according to the present invention is a read-only optical disk including an optical disk substrate of a predetermined thickness having a light incidence surface on one face, in which at least a pit information surface, a printing layer, and a protective layer are formed in this order on a side of the other face opposed to the light incidence surface. The protective layer is the protective layer suited for the floating-type magnetic head used for the magnetic field modulation type magneto-optical disk or the protective layer suited for the sliding-type magnetic head used for the magnetic field modulation type magneto-optical disk. This configuration not only gives the effect of the optical disk of the first configuration described above but also allows a title or the like to be displayed on an optical disk itself using the printing layer, so that the optical disk can be identified simply by the appearance of the optical disk itself alone.

Furthermore, an optical disk of a third configuration according to the present invention is a partially recorded optical disk including an optical disk substrate of a predetermined thickness having a light incidence surface on one face, in which at least a layer, divided into a pit information surface region and a magneto-optical recording surface region, and a protective layer are formed in this order on a side of the other face opposed to the light incidence surface. The protective layer is the protective layer suited for the floating-type magnetic head used for the magnetic field modulation type magneto-optical disk or the protective layer suited for the sliding-type magnetic head used for the magnetic field modulation type magneto-optical disk. According to this configuration, since the protective layer suited for the floating-type or the sliding-type magnetic head is provided on the face opposed to the light incidence surface, a partially recorded optical disk can be obtained that allows the floating-type or the sliding-type magnetic head used for the magnetic field modulation type magneto-optical disk to be operated.

Furthermore, an optical disk of a fourth configuration according to the present invention is a partially recorded optical disk including an optical disk substrate of a predetermined thickness having a light incidence surface on one face, in which at least a layer, divided into a pit information surface region and a magneto-optical recording surface region, a printing layer, and a protective layer are formed in this order on a side of the other face opposed to the light incidence surface. The protective layer is the protective layer suited for the floating-type magnetic head used for the magnetic field modulation type magneto-optical disk or the protective layer suited for the sliding-type magnetic head used for the magnetic field modulation type magneto-optical disk. This configuration not only gives the effect of the optical disk of the third configuration described above but also allows a title or the like to be displayed on an optical disk itself using the printing layer, so that the optical disk can be identified simply by the appearance of the optical disk itself alone.

Preferably, the optical disks of the first to fourth configurations described above allow recording and/or reproduction to be performed by an optical disk device so that compatibility with the magnetic field modulation type magneto-optical disk is attained. According to this configuration, a single optical disk device allows recording and reproduction with respect to the magnetic field modulation type magneto-optical disk and recording and/or reproduction with respect to the optical disks of the first to fourth configurations described above.

Preferably, each of the optical disks of the first to fourth configurations described above is housed in an optical disk cartridge having an opening formed so that the light incidence surface and the surface of the protective layer are exposed. According to this configuration, commonality between the optical disk cartridge and an optical disk cartridge for housing the magnetic field modulation type magneto-optical disk can be achieved.

Preferably, each of the protective layers of the optical disks of the first to fourth configurations described above is formed of an ultraviolet curable resin coated with a silicone oil. According to this configuration, a protective layer can be formed easily, on which a magnetic head can float or slide as in the case of the magnetic field modulation type magneto-optical disk that allows recording and reproduction.

Furthermore, preferably, each of the protective layers of the optical disks of the first to second configurations described above is formed of an ultraviolet curable resin coated with a silicone oil having a viscosity lower than that of a silicone oil used for a protective layer of the magnetic field modulation type magneto-optical disk. According to this configuration, a protective layer and a magnetic head can be improved in durability, thereby achieving longer life times.

Furthermore, preferably, in each of the optical disks described above, identification data regarding the protective layer is recorded on the optical disk and/or the optical disk cartridge. According to this configuration, malfunctions in an optical disk device and damage to an optical disk and the optical disk device can be prevented.

Furthermore, an optical disk of a fifth configuration according to the present invention is a magnetic field modulation type magneto-optical disk including an optical disk substrate of a predetermined thickness having a light incidence surface on one face, in which at least a magneto-optical recording surface, a printing layer, and a protective layer are formed in this order on a side of the other face opposed to the light incidence surface. The protective layer is the protective layer suited for the floating-type magnetic head or the protective layer suited for the sliding-type magnetic head. This configuration allows a title or the like to be displayed on an optical disk itself using the printing layer, so that a magnetic field modulation type magneto-optical disk can be obtained that can be identified simply by the appearance of the optical disk itself alone.

Furthermore, an optical disk device of a first configuration according to the present invention is an optical disk device including a floating-type or a sliding-type magnetic head and an optical head. The optical disk device can perform recording and/or reproduction with respect to the magnetic field modulation type magneto-optical disk, in which recording and/or reproduction with respect to the optical disks of the first to fourth configurations described above can be performed so that compatibility with the magnetic field modulation type magneto-optical disk is attained. According to this configuration, a single optical disk device allows recording and/or reproduction with respect to both the magnetic field modulation type magneto-optical disk and the optical disks of the first to fourth configurations described above.

Furthermore, an optical disk device of a second configuration according to the present invention is an optical disk device including a floating-type or a sliding-type magnetic head and an optical head. The optical disk device can perform recording and/or reproduction with respect to the magnetic field modulation type magneto-optical disk and the optical disks of the first to fourth configurations described above. The magnetic head is retracted when mounting the magneto-optical disk and the optical disks and allowed to slide or float when performing recording and reproduction with respect to the magneto-optical disk and the optical disks. According to this configuration, a single optical disk device allows recording and/or reproduction with respect to both the magnetic field modulation type magneto-optical disk and the optical disks of the first to fourth configurations described above. Further, according to this configuration, an optical disk device can be manufactured at lower cost and reduced in size, the performance of the optical disk device can be improved by enhancing realization of a high-speed seek, and commonality of a disk cartridge can be achieved.

Furthermore, an optical disk device of a third configuration according to the present invention is an optical disk device including a floating-type or a sliding-type magnetic head and an optical head. The optical disk device can perform recording and/or reproduction with respect to the magnetic field modulation type magneto-optical disk and the optical disks of the first to fourth configurations described above. The magnetic head is retracted when mounting the magneto-optical disk and the optical disks, separated from the magneto-optical disk when performing reproduction with respect to the magneto-optical disk, and allowed to slide or float when performing recording with respect to the magneto-optical disk and recording and reproduction with respect to the optical disks. According to this configuration, a single optical disk device allows recording and/or reproduction with respect to both the magnetic field modulation type magneto-optical disk and the optical disks of the first to fourth configurations described above. Further, according to this configuration, a high-speed seek can be performed with respect to the optical disks of the present invention, and recording and reproduction with respect to the conventional magneto-optical disk can be performed with the magnetic head held in the same positions as in the case of a conventional optical disk device.

Furthermore, an optical disk device of a fourth configuration according to the present invention is an optical disk device including a floating-type or a sliding-type magnetic head and an optical head. The optical disk device performs recording or reproduction while allowing the magnetic head to float or slide on an optical disk. The optical disk device further includes a detecting unit for detecting a floating or a sliding state of the magnetic head when the magnetic head is floating or sliding on the optical disk and a controlling unit for bringing the floating or the sliding state to a halt or giving a predetermined warning when the floating or the sliding state is judged to be abnormal based on a result obtained by the detecting unit. According to this configuration, when various types of optical disks are driven by a single optical disk device, damage to the optical disks and the optical disk device can be prevented.

In the optical disk device of the fourth configuration described above, it is preferable that the detecting unit detects a force exerted on the magnetic head by the optical disk. According to this configuration, an abnormality caused between the magnetic head and the optical disk can be detected easily.

Furthermore, in the optical disk device of the fourth configuration described above, it is preferable that after bringing the floating or the sliding state to the halt, the controlling unit further stops the rotation of the optical disk or ejects the optical disk. According to this configuration, damage to the optical disk and the optical disk device can be prevented from being caused.

As described above, the present invention is to provide, as future optical disks, a read-only optical disk and a partially recorded optical disk that allow operations to be performed so that compatibility with the magnetic field modulation type magneto-optical disk is attained, and a read-only optical disk and a partially recorded optical disk, each housed in an optical disk cartridge that is common to the optical disk cartridge used for the magnetic field modulation type magneto-optical disk. Further, the present invention is to provide an optical disk device that can perform recording and reproduction with respect to the magnetic field modulation type magneto-optical disk, in which recording and/or reproduction with respect to the optical disks of the present invention described above can be performed so that compatibility with the magnetic field modulation type magneto-optical disk is attained. Thus, an optical disk and an optical disk device for performing recording and/or reproduction with respect to the optical disk can be obtained, which allow an optical disk device to be manufactured at lower cost and reduced in size mainly by improving the configuration of a lifter mechanism, improve the performance of the optical disk device by enhancing realization of a high-speed seek, and allow commonality of a disk cartridge to be achieved, thus being user-friendly.

BRIEF DESCRIPTION OF THE DRAWINGS

FIG. 3A is a cross-sectional view schematically showing the configurations of a MD (a minidisk) as a conventional recordable optical disk and an optical disk device for performing recording and reproduction with respect to the MD. FIG. 3B is a cross-sectional view schematically showing the configurations of a MD as a conventional read-only optical disk and an optical disk device for performing reproduction with respect to the MD.

BEST MODE FOR CARRYING OUT THE INVENTION

Hereinafter, the present invention will be described by way of embodiments with reference to the appended drawings.

Embodiment 1

In the following description, the configuration and operation of Embodiment 1 according to the present invention is described with reference to FIGS. 1A and 1B.

Figure 1A:
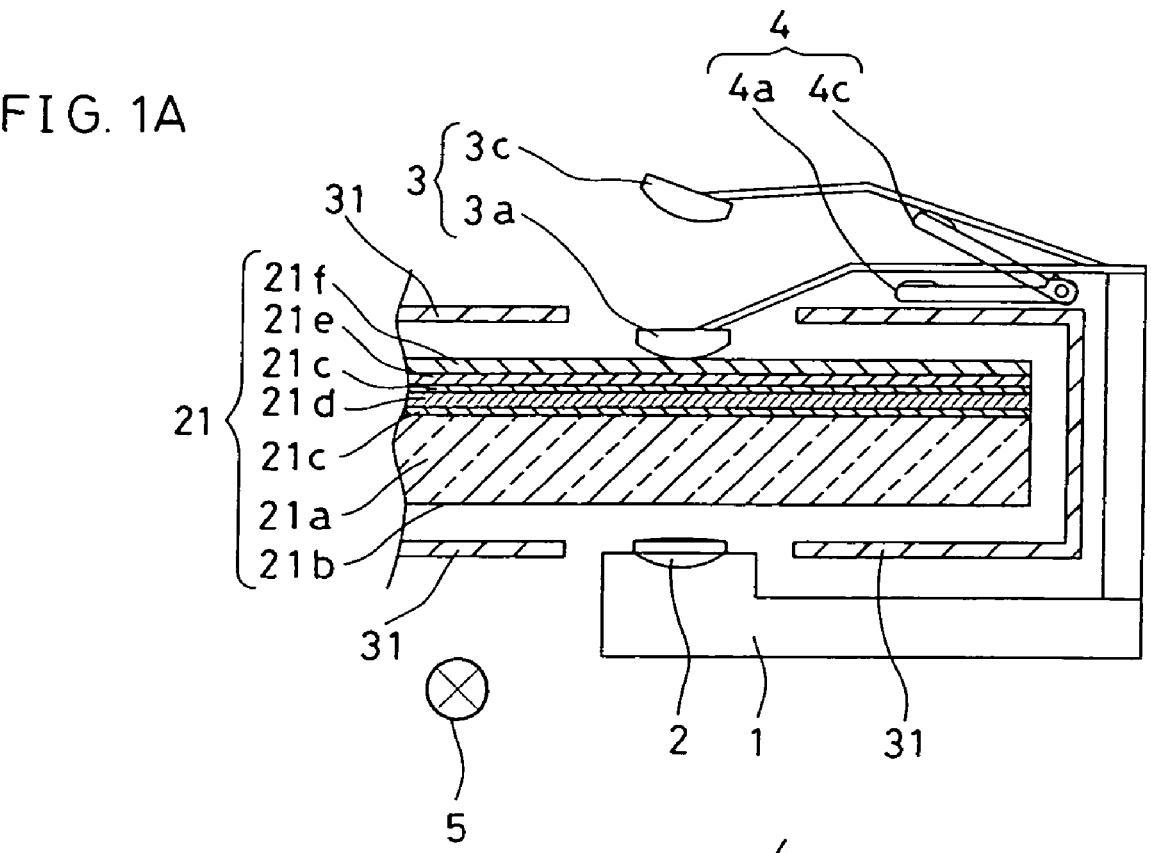
FIG. 1A is a cross-sectional view schematically showing the configurations of a magnetic field modulation type magneto-optical disk and an optical disk device of Embodiment 1 according to the present invention for performing recording and reproduction with respect to the magnetic field modulation type magneto-optical disk.
Figure 1B:
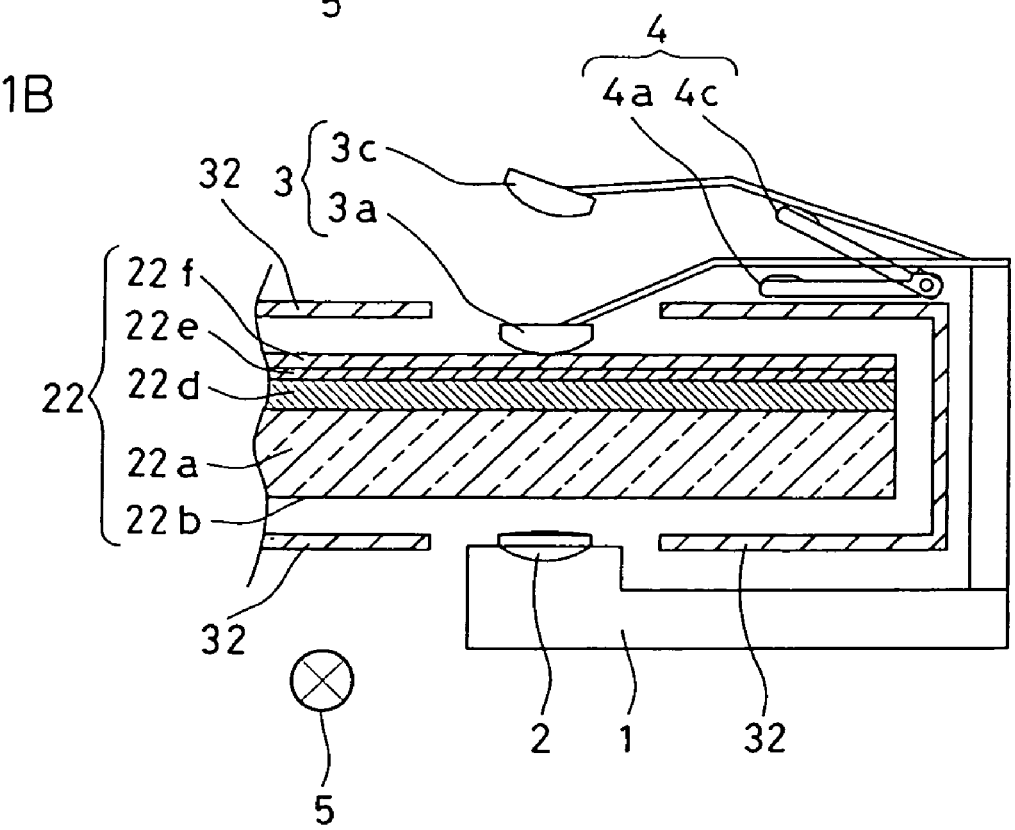
FIG. 1B is a cross-sectional view schematically showing the configurations of a read-only optical disk of Embodiment 1 according to the present invention and an optical disk device of the present invention for performing reproduction with respect to the read-only optical disk.

FIGS. 1A and 1B are cross-sectional views schematically showing the configurations of a magnetic field modulation type magneto-optical disk, an optical disk of the present invention, and an optical head and a magnetic head in an optical disk device of the present invention for performing recording and reproduction with respect to the magneto-optical disk and the optical disk of the present invention. The configurations and operations of the magneto-optical disk, the optical disk of the present invention, the optical head, and the magnetic head will be detailed in the following.

In FIG. 1A, reference characters 21 and 31 denote a magnetic field modulation type magneto-optical disk as a thin disk of small diameter and an optical disk cartridge housing the magnetic field modulation type magneto-optical disk 21, respectively.

In the magnetic field modulation type magneto-optical disk 21, reference characters 21a and 21c denote an optical disk substrate for transmitting a light beam that has passed through a light incidence surface 21b, which is formed of a transparent polycarbonate resin having a thickness of 0.6 mm, and a dielectric film that gives the effect of allowing optical enhancement to be attained, respectively. Further, reference characters 21d, 21e and 21f denote a magneto-optical recording surface obtained by providing a magneto-optical recording medium mainly containing terbium, iron, cobalt, or the like on a surface to be irradiated with a light beam transmitted via the optical disk substrate 21a, a reflective film mainly containing aluminum, and a protective layer formed of an ultraviolet curable resin, respectively. The protective layer is coated with a silicone oil (such as polydimethyl silicone) as will be described later.

In the figure, reference characters 1, 2 and 3 denote an optical head having a light emitting part and a light receiving part, an objective lens mounted on the optical head 1, which focuses a light beam emitted from the light emitting part on the magneto-optical recording surface 21d, and a sliding-type magnetic head that is of the magnetic field modulation type, respectively. Further, reference character 4 denotes a lifter mechanism for regulating a positional relationship, i.e. spacing between the magnetic head 3 and the magnetic field modulation type magneto-optical disk 21. The optical head 1, the objective lens 2, and the magnetic head 3 are allowed to move (seek) as a unit in a radial direction (a direction perpendicular to a plane on which the figure is drawn) 5 of the magnetic field modulation type magneto-optical disk 21.

The optical disk cartridge 31 has openings on a side of the magnetic head 3 as well as a side of the optical head 1, each of which has a shutter (not shown) that can be opened and closed.

The magnetic head 3 and the lifter mechanism 4 are operated in the following two operation modes.

In the figure, reference character 3a denotes a recording and reproducing mode for the magnetic head 3. In the recording and reproducing mode 3a, the magnetic head 3 that has been inserted through one of the openings of the optical disk cartridge 31 is sliding on the protective layer 21f of the magnetic field modulation type magneto-optical disk 21. This operation requires a sliding member (a member to be brought into contact with the magnetic field modulation type magneto-optical disk 21, not shown) of the magnetic head 3 to have sliding characteristics in which importance is placed on abrasion resistance or the like. The protective layer 21f also has a composition in which importance is placed on the sliding characteristics. For example, the protective layer 21f is coated with a silicone oil (such as polydimethyl silicone). Further, reference character 4a denotes a recording and reproducing mode of the lifter mechanism 4 in which the magnetic head 3 is put into the recording and reproducing mode 3a by the lifter mechanism 4. In the recording and reproducing mode 4a, the lifter mechanism 4 is out of contact with the magnetic head 3.

As described above, in this embodiment, the magnetic head 3 is sliding on the magnetic field modulation type magneto-optical disk 21 during reproduction as well as recording.

In the figure, reference character 3c denotes a mode (a cartridge insertion mode) for the magnetic head 3 in which the optical disk cartridge 31 housing the magnetic field modulation type magneto-optical disk 21 is inserted into the optical disk device to be mounted in a mechanism (not shown). In the cartridge insertion mode 3c, the magnetic head 3 is held (retracted) so that a given spacing is provided between the magnetic head 3 and the optical disk cartridge 31 to avoid interference between them. Further, reference character 4c denotes a cartridge insertion mode for the lifter mechanism 4 in which the magnetic head 3 is put into the cartridge insertion mode 3c by the lifter mechanism 4. In the cartridge insertion mode 4c, the lifter mechanism 4 is in contact with the magnetic head 3 to lift the magnetic head 3.

In FIG. 1B, reference characters 22 and 32 denote a read-only optical disk that allows operations to be performed so that compatibility with the magnetic field modulation type magneto-optical disk 21 is attained and an optical disk cartridge housing the read-only optical disk 22, respectively.

In the read-only optical disk 22, reference character 22a denotes an optical disk substrate for transmitting a light beam that has passed through a light incidence surface 22b, which is formed of a transparent polycarbonate resin having a thickness of 0.6 mm. Further, reference characters 21d, 22e, and 22f denote a pit information surface formed on a surface to be irradiated with a light beam transmitted via the optical disk substrate 22a, a reflective film mainly containing aluminum, and a protective layer formed of an ultraviolet curable resin, respectively.

In the figure, the protective layer 22f is coated with a silicone oil (such as polydimethyl silicon) as will be described later. The silicone oil has the same composition as that of the silicone oil used for the protective layer 21f of the magnetic field modulation type magneto-optical disk 21. The silicone oil can be formed easily by the spin-coat method or the like used for forming the protective layer 21f and thus can be manufactured at considerably low cost in terms of man-hours and materials. Therefore, in the read-only optical disk 22, a cost increase produced by applying the silicone oil is considerably small.

In the figure, as in the case of the magnetic field modulation type magneto-optical disk 21 shown in FIG. 1A, reference characters 1, 2, and 3 denote an optical head, an objective lens, and a magnetic head, respectively. Further, reference character 4 denotes a lifter mechanism for regulating a positional relationship, i.e. spacing between the magnetic head 3 and the read-only optical disk 22. These components are the same as those of the optical disk device used in the case of the magnetic field modulation type magneto-optical disk 21. The optical disk 1, the objective lens 2, and the magnetic head 3 are allowed to move (seek) as a unit in a radial direction (the direction perpendicular to the plane on which the figure is drawn) 5 of the read-only optical disk 22.

The optical disk cartridge 32 has openings on a side of the magnetic head 3 as well as a side of the optical head 1, each of which has a shutter (not shown) that can be opened and closed.

The magnetic head 3 and the lifter mechanism 4 are operated in the following two operation modes.

In the figure, reference character 3a denotes a reproducing mode for the magnetic head 3. In the reproducing mode 3a, the magnetic head 3 that has been inserted through one of the openings of the optical disk cartridge 32 is sliding on the protective layer 22f of the read-only optical disk 22. This operation requires a sliding member (a member to be brought into contact with the read-only optical disk 22, not shown) of the magnetic head 3 to have the sliding characteristics in which importance is placed on abrasion resistance or the like. The protective layer 22f also has a composition in which importance is placed on the sliding characteristics and is coated with a silicone oil (such as polydimethyl silicone) as described above. Further, reference character 4a denotes a reproducing mode of the lifter mechanism 4 in which the magnetic head 3 is put into the reproducing mode 3a by the lifter mechanism 4. In the reproducing mode 4a, the lifter mechanism 4 is out of contact with the magnetic head 3.

In the case of the magnetic field modulation type magneto-optical disk 21 described with reference to FIG. 1A, a recording operation requires that the magnetic head 3 slide on the protective layer 21f. On the contrary, in the case of the read-only optical disk 22 shown in FIG. 1B, a recording operation is not included in the operation modes, and thus it is not required that the optical disk device be capable of the recording operation with respect to the read-only optical disk 22 and the magnetic head 3 be allowed to slide on the protective layer 22f. However, in this embodiment, the optical disk cartridge 32 is provided with the openings and the shutters on the side of the magnetic head 3 as well as the side of the optical disk 1 as in the case of the optical disk cartridge 31. When reproduction is performed with respect to the read-only optical disk 22, unlike the case of performing reproduction with respect to the conventional MD-ROM 62 (see FIG. 3B), the magnetic head 3 is allowed to slide on the optical disk.

In FIG. 1B, reference character 3c denotes a mode (a cartridge insertion mode) for the magnetic head 3 in which the optical disk cartridge 32 housing the read-only optical disk 22 is inserted into the optical disk device to be mounted in a mechanism (not shown). In the cartridge insertion mode 3c, the magnetic head 3 is held (retracted) so that a given spacing is provided between the magnetic head 3 and the optical disk cartridge 32 to avoid interference between them. Further, reference character 4c denotes a cartridge insertion mode of the lifter mechanism 4 in which the magnetic head 3 is put into the cartridge insertion mode 3c by the lifter mechanism 4. In the cartridge insertion mode 4c, the lifter mechanism 4 is in contact with the magnetic head 3 to lift the magnetic head 3.

The following description is directed to recording and reproducing operations with respect to the magnetic field modulation type magneto-optical disk 21 and the read-only optical disk 22 that allow operations to be performed so that compatibility with the magnetic field modulation type magneto-optical disk 21 is attained.

In the recording operation of the magnetic field modulation type magneto-optical disk 21, as shown in FIG. 1A, the magnetic head 3 is put into the recording and reproducing mode 3a. Then, a modulated magnetic field is applied from the magnetic head 3 to the magneto-optical recording surface 21d based on a modulating signal, and DC (direct current) light of a relatively high power level is emitted from the optical head 1, so that a minute beam spot is formed on the magneto-optical recording surface 21d using the objective lens 2. This allows a magneto-optical information signal to be recorded by a so-called magnetic field modulation recording method.

In the reproducing operation of the magnetic field modulation type magneto-optical disk 21, the magnetic head 3 is put into the recording and reproducing mode 3a. Then, while the magnetic head 3 is not energized, DC (direct current) light of a relatively low power level is emitted from the optical head 1, so that a minute beam spot is formed on the magneto-optical recording surface 21d using the objective lens 2. This allows the light beam reflected from the magneto-optical recording surface 21d to be reproduced as a magneto-optical information signal due to the so-called Kerr effect.

In the reproducing operation of the read-only optical disk 22, as shown in FIG. 1B, the magnetic head 3 is put into the reproducing mode 3a. Then, while the magnetic head 3 is not energized, DC (direct current) light of a relatively low power level is emitted from the optical head 1, so that a minute beam spot is formed on the pit information surface 22d using the objective lens 2. This allows the light beam reflected from the pit information surface 22d to be reproduced as a pit information signal obtained by detecting the presence or absence of a pit based on the so-called variation in intensity of the light beam.

In the above description, other components of the optical disk device such as a motor, a circuit, and a disk loading and holding mechanism are not described nor shown in the figures since they are not related directly to the present invention.

As described above, in this embodiment, a single optical disk device allows recording and reproducing operations with respect to the magnetic field modulation type magneto-optical disk 21 and a reproducing operation with respect to the read-only optical disk 22 in which compatibility with the magneto-optical disk 21 is attained.

In this embodiment, the lifter mechanism 4 provided in the optical disk device is only required to be operated in two operation modes, i.e. the recording and reproducing mode 4a or the reproducing mode 4a and the cartridge insertion mode 4c. Thus, compared with the conventional optical disk device required to have three operation modes, the optical disk device of the present invention has the effects described in the following: the lifter mechanism 4 can be of a simple mechanism design; the number of components can be reduced; less room is required for the lifter mechanism 4; and the system control can be simplified. As a result, the optical disk device can be manufactured at lower cost.

Furthermore, when reproduction is performed with respect to the magnetic field modulation type magneto-optical disk 21 and the read-only optical disk 22, the lifter mechanism 4 is put into the recording and reproducing mode 4a or the reproducing mode 4a and thus is out of contact with the magnetic head 3. Therefore, when the optical head 1 is allowed to perform a seeking operation at a high speed in the disk radial direction 5, the lifter mechanism 4 and the magnetic head 3 are not brought to a state where the two components are mechanically in contact with each other. Instead, the magnetic head 3 is brought to a state of simply sliding on the protective layer 2 if or the protective layer 22f under a condition of highly favorable sliding characteristics. That is, when a high-speed seeking operation is performed in reproduction, mechanism resonance, vibration caused by external disturbances, stick-slip, and the like are not caused, which cause even a servo signal of the objective lens 2 to be affected, thereby making the seeking operation unstable as in the case of the conventional optical disk device.

Moreover, each of the optical disk cartridges 31 and 32 is structured so as to have the openings and the shutters on the side of the magnetic head 3 as well as the side of the optical head 1, thereby giving the considerable effect of achieving commonality of an optical disk cartridge. This effect contributes greatly to the product value and the cost of the entire disk system.

That is, in this embodiment, there are provided, as future optical disks, the magnetic field modulation type magneto-optical disk 21 and the read-only optical disk 22 that allows operations to be performed so that compatibility with the magnetic field modulation type magneto-optical disk 21 is attained, together with the optical disk cartridges 31 and 32 housing these optical disks. Further, in this embodiment, there is provided the optical disk device that can perform recording and reproduction with respect to the magnetic field modulation type magneto-optical disk 21, in which reproduction with respect to the read-only optical disk 22 can be performed so that compatibility with the magnetic field modulation type magneto-optical disk 21 is attained. Thus, an optical disk and an optical disk device for performing recording and/or reproduction with respect to the optical disk can be obtained, which allow an optical disk device to be manufactured at lower cost and reduced in size mainly by improving the configuration of a lifter mechanism, improve the performance of the optical disk device by enhancing realization of a high-speed seek, and allow commonality of a disk cartridge to be achieved, thus being user-friendly.

In this embodiment, preferably, the viscosity of the silicone oil applied to the protective layer 22f of the read-only optical disk 22 is lower than that of the silicone oil applied to the protective layer 2 if of the magnetic field modulation type magneto-optical disk 21 for the following reason. In the magnetic field modulation type magneto-optical disk 21, it is required that the magnetic head 3 slide (or float) on the protective layer 21f stably so that recording and erasing operations are performed accurately. On the other hand, in the read-only optical disk 22, since there is no recording and erasing operations, it is more important that the magnetic head 3 and the optical disk 22 are not damaged when the magnetic head 3 slides (or floats) on the protective layer 22f than whether the magnetic head 3 slides (or floats) on the protective layer 22f stably or not. Generally, when a magnetic head is in a sliding (or a floating) state, the lower the temperature, the more the magnetic head and a protective layer become susceptible to damage. As a solution to this, the viscosity of the silicone oil used for the protective layer 22f of the read-only optical disk 22 is made lower. This allows damage to the protective layer 22f of the read-only optical disk 22 and the magnetic head 3 to be reduced, and thus the protective layer 22f and the magnetic head 3 can be improved in durability, thereby achieving longer life times.

Embodiment 2

In the following description, the configuration and operation of Embodiment 2 according to the present invention is described with reference to FIGS. 2A and 2B.

Figure 2A:
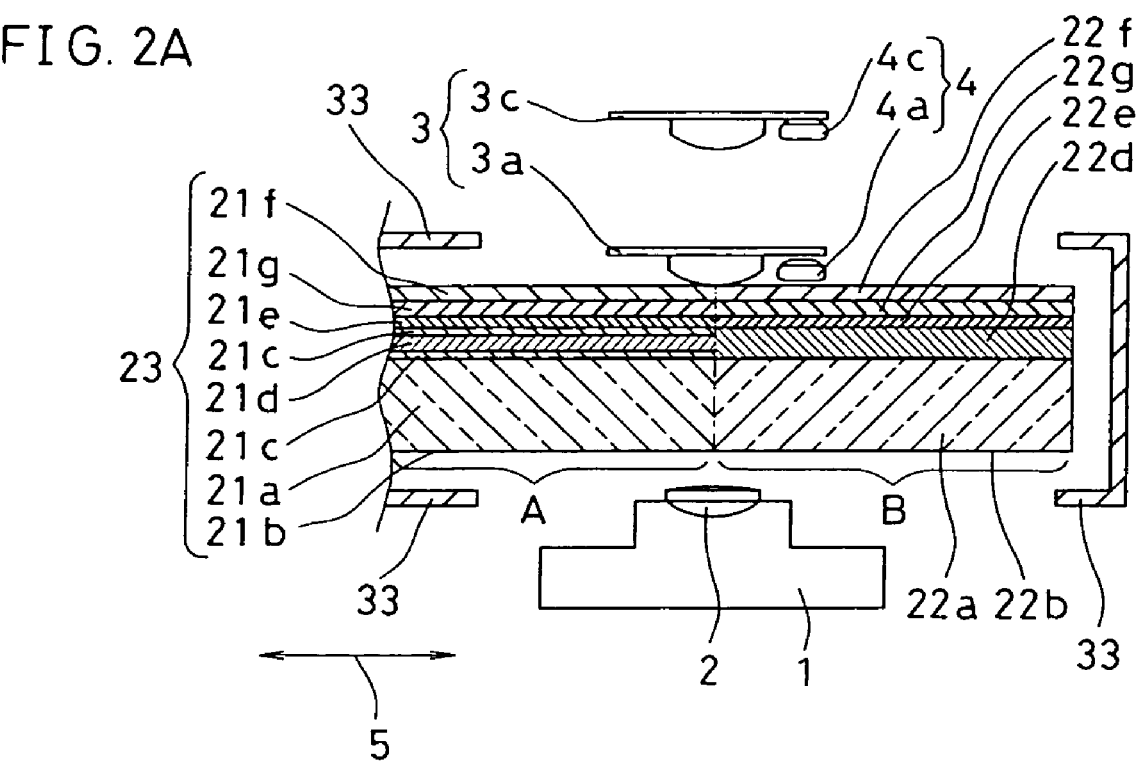
FIG. 2A is a cross-sectional view schematically showing the configurations of a partially recorded optical disk of Embodiment 2 according to the present invention and an optical disk device of the present invention for performing recording and reproduction with respect to the partially recorded optical disk.
Figure 2B:
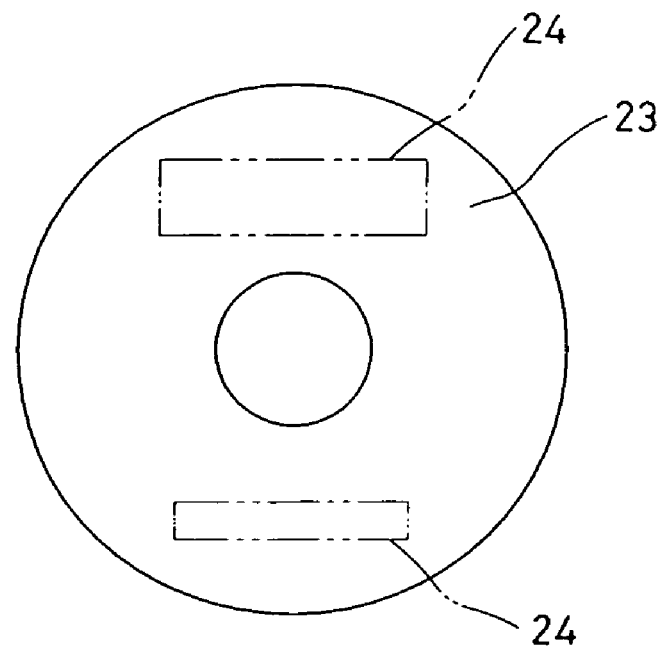
FIG. 2B is a plan view of the partially recorded optical disk of Embodiment 2 according to the present invention.

FIGS. 2A and 2B are cross-sectional views schematically showing the configurations of an optical disk of the present invention and an optical head and a magnetic head in an optical disk device for performing recording and reproduction with respect to the optical disk. The configurations and operations of the optical disk, the optical head, and the magnetic head will be detailed in the following.

In FIG. 2A, reference character 23 denotes a partially recorded optical disk as a thin disk of small diameter that allows operations to be performed so that compatibility with the magnetic field modulation type magneto-optical disk 21 shown in FIG. 1A is attained. Generally, the partially recorded optical disk is referred to as a partial ROM. Further, reference character 33 denotes an optical disk cartridge housing the partially recorded optical disk 23.

FIG. 2A is a cross-sectional view taken in a radial direction that shows a recordable region and a read-only region of the partially recorded optical disk 23. In the partially recorded optical disk 23, an area A of the recordable region and an area B of the read-only region are formed as separate regions on the same plane. In the partially recorded optical disk 23, the area A of the recordable region has the same configuration as that of the magnetic field modulation type magneto-optical disk 21 shown in FIG. 1A, and the area B of the read-only region has the same configuration as that of the read-only optical disk 22 shown in FIG. 1B. Accordingly, in FIG. 2A, components denoted by reference characters 21a to 21f and 22a to 22f and components denoted by reference characters 1, 2, 3, and 4 are the same as those denoted by like reference characters in FIGS. 1A and 1B, respectively. The partially recorded optical disk 23 is formed as a single optical disk, and thus an optical disk substrate 21a, a light incidence surface 21b, a reflective film 21e, and a protective layer 21f have the same compositions as those of an optical disk substrate 22a, a light incidence surface 22b, a reflective film 22e, and a protective layer 22f, respectively. However, each of the components in the area A is denoted by a different reference character from that denoting the corresponding component in the area B so that it can be distinguished whether the component belongs to the area A or the area B.

The optical disk cartridge 33 has openings on a side of a magnetic head 3 as well as a side of an optical head 1, each of which has a shutter (not shown) that can be opened and closed. Each of the openings is formed so as to cover the area B of the read-only region as well as the area A of the recordable region.

The optical head 1, the objective lens 2, and the magnetic head 3 are allowed to move (seek) as a unit in a radial direction 5 of the partially recorded optical disk 23.

The magnetic head 3 and a lifter mechanism 4 are operated in the following two operation modes.

In the figure, reference character 3a denotes a recording and reproducing mode for the magnetic head 3 when the magnetic head 3 is in the area A of the recordable region and denotes a reproducing mode for the magnetic head 3 when the magnetic head 3 is in the area B of the read-only region. In the mode 3a, the magnetic head 3 is sliding on the protective layers 2 if and 22f. This operation requires a sliding member (a member to be brought into contact with the partially recorded optical disk 23, which is the same as the member to be brought into contact with the magnetic field modulation type magneto-optical disk 21 shown in FIG. 1A, not shown) of the magnetic head 3 to have sliding characteristics in which importance is placed on abrasion resistance or the like. The protective layers 21f and 22f also have a composition in which importance is placed on the sliding characteristics. For example, the protective layers 21f and 22f are coated with a silicone oil (such as polydimethyl silicone). Further, reference character 4a denotes a recording and reproducing mode for the lifter mechanism 4 in which the magnetic head 3 is put into the recording and reproducing mode 3a by the lifter mechanism 4. In the recording and reproducing mode 4a, the lifter mechanism 4 is out of contact with the magnetic head 3.

As described above, in this embodiment, with respect to the area A of the recordable region, the magnetic head 3 is sliding on the partially recorded optical disk 23 during reproduction as well as recording, and with respect to the area B of the read-only region, the magnetic head 3 is sliding on the partially recorded optical disk 23 even during reproduction.

In the figure, reference character 3c denotes a mode (a cartridge insertion mode) for the magnetic head 3 in which the optical disk cartridge 33 housing the partially recorded optical disk 23 is inserted into the optical disk device to be mounted in a mechanism (not shown). In the cartridge insertion mode 3c, the magnetic head 3 is held (retracted) so that a given spacing is provided between the magnetic head 3 and the optical disk cartridge 33 to avoid interference between them. Further, reference character 4c denotes a cartridge insertion mode for the lifter mechanism 4 in which the magnetic head 3 is put into the cartridge insertion mode 3c by the lifter mechanism 4. In the cartridge insertion mode 4c, the lifter mechanism 4 is in contact with the magnetic head 3 to lift the magnetic head 3.

In this embodiment, printing layers 21g and 22g are provided between reflective films 21e and 22e and the protective layers 21f and 22f. The partially recorded optical disk 23 is formed as a single optical disk, and thus the printing layers 21g and 22g are components of the same composition. However, these components are denoted by different reference characters from each other so that it can be distinguished whether the respective components belong to the area A or the area B. The printing layers 21g and 22g are provided so that on the printing layers 21g and 22g, a title or the like is displayed and recorded for distinction, identification, or the like of the partially recorded optical disk 23. This allows users to distinguish the optical disk 23 from other optical disks simply by the appearance of the optical disk 23 alone. For example, as shown in FIG. 2B, characters, symbols, or the like are displayed in regions 24 shown by chain double-dashed lines, so that the optical disk can be distinguished and identified when the partially recorded optical disk 23 is drawn out of the optical disk cartridge 33 or when the optical disk cartridge 33 is formed of a transparent material.

Recording and reproducing operations of the partially recorded optical disk that allows operations to be performed so that compatibility with the magnetic field modulation type magneto-optical disk 21 shown in FIG. 1A is attained are performed in the following manner. With respect to the area A of the recordable region, the operations are performed in the same manner as in the recording and reproducing operations of the magnetic field modulation type magneto-optical disk 21 described with reference to FIG. 1A. With respect to the area B of the read-only region, the operations are performed in the same manner as the reproducing operation of the read-only optical disk 22 described with reference to FIG. 1B.

In the above description, other components of the optical disk device such as a motor, a circuit, and a disk loading and holding mechanism are not described nor shown in the figures since they are not related directly to the present invention.

As described above, in this embodiment, a single optical disk device allows recording and reproducing operations with respect to the magnetic field modulation type magneto-optical disk 21 and recording and reproducing operations performed in the recordable region A and a reproducing operation performed in the read-only region B of the partially recorded optical disk 23 that allows operations to be performed so that compatibility with the magneto-optical disk 21 is attained.

In this embodiment, the lifter mechanism 4 provided in the optical disk device is only required to be operated in two operation modes, i.e. the recording and reproducing mode 4a and the cartridge insertion mode 4c. That is, the operation modes of the lifter mechanism 4 do not include a mode in which the magnetic head 3 is lifted by the lifter mechanism 4 so that a spacing is provided between the magnetic head 3 and the partially recorded optical disk 23 to avoid contact between them in reproduction of the area A of the recordable region and the area B of the read-only region in the partially recorded optical disk 23. Thus, compared with the conventional optical disk device required to have three operation modes, the optical disk device of the present invention has the effects described in the following: the lifter mechanism 4 can be of a simple mechanism design; the number of components can be reduced; and less room is required for the lifter mechanism 4. In addition, for example, in an operation in which reproduction in the area B followed by recording in the area A is repeatedly performed, an effect of further simplifying a system control can be given. As a result, the optical disk device can be manufactured at lower cost.

Furthermore, in reproduction with respect to the magnetic field modulation type magneto-optical disk 21 and the partially recorded optical disk 23, the lifter mechanism 4 is put into the recording and reproducing mode 4a and thus is out of contact with the magnetic head 3. Therefore, when the optical head 1 is allowed to perform a seeking operation at a high speed in the disk radial direction 5, the lifter mechanism 4 and the magnetic head 3 are not brought to a state where the two components are mechanically in contact with each other. Instead, the magnetic head 3 is brought to a state of simply sliding on the protective layer 21f or the protective layer 22f under a condition of highly favorable sliding characteristics. That is, when a high-speed seeking operation is performed in reproduction, mechanism resonance, vibration caused by external disturbances, stick-slip, and the like are not caused, which cause even a servo signal of the objective lens 2 to be affected, thereby making the seeking operation unstable as in the case of the conventional optical disk device. This effect is brought to the fore particularly in the operation in which reproduction in the area B followed by recording in the area A is repeatedly performed.

Moreover, a considerable effect further is given in which commonality between the optical disk cartridge 33 and the optical disk cartridge 31 can be achieved. This effect contributes greatly to the product value and the cost of the entire disk system.

In addition, the printing layers 21g and 22g are provided so that a title or the like can be displayed on the partially recorded optical disk 23 itself. This allows users to distinguish the optical disk from other disks simply by the appearance of the optical disk itself alone.

That is, in this embodiment, there are provided, as a future optical disk, the partially recorded optical disk 23 that allows operations to be performed so that compatibility with the magnetic field modulation type magneto-optical disk 21 is attained, and the optical disk cartridge 33 housing this optical disk. Further, in this embodiment, there is provided the optical disk device that can perform recording and reproduction with respect to the magnetic field modulation type magneto-optical disk 21, in which recording and reproduction with respect to the partially recorded optical disk 23 can be performed so that compatibility with the magnetic field modulation type magneto-optical disk 21 is attained. Thus, an optical disk and an optical disk device for performing recording and/or reproduction with respect to the optical disk can be obtained, which allow an optical disk device to be manufactured at lower cost and reduced in size mainly by improving the configuration of a lifter mechanism, improve the performance of the optical disk device by enhancing realization of a high-speed seek, allow commonality of a disk cartridge to be achieved, and allow a display of an optical disk title to be realized, thus being user-friendly.

In each of Embodiments 1 and 2 described above, the magnetic head 3 is of the sliding-type and the protective layers 21f and 22f are of a configuration in which importance is placed on the sliding characteristics. However, the magnetic head 3 may be of a floating-type and the protective layers 21f and 22f may be of a configuration (the thickness of the protective layers and the viscosity and composition of the silicone oil to be applied to the protective layers) in which importance is placed on floating characteristics.

Furthermore, in the aforementioned embodiment, the printing layers 21g and 22g are formed in the partially recorded optical disk 23 as an example. However, the printing layers may be formed in the magnetic field modulation type magneto-optical disk 21 and the read-only disk 22.

Furthermore, in Embodiments 1 and 2, identification data regarding the protective layers 21f and 22f may be recorded on the optical disks 22 and 23 and/or the optical disk cartridges 32 and 33. The identification data regarding the protective layers 21f and 22f includes information for identifying, for example, the presence and absence of the protective layer, the viscosity of the silicone oil applied to the protective layer, and the thickness of the protective layer. When recording such identification data on an optical disk, the identification data can be recorded in, for example, a region referred to as a control data region in which disk controlling information is recorded as well as on the optical disk. Further, when recording the identification data on an optical disk cartridge, the identification data can be recorded on the outer surface of the optical disk cartridge using a barcode or recorded in such a manner that the appearance of the optical disk cartridge is made different by, for example, providing a concave portion (such as a detection hole) in a predetermined position. The identification data regarding the protective layer as described above is recorded, so that an optical disk device can identify which type of optical disk is mounted thereto. Then, the optical disk device can perform an operation that is suitable for the result thereby obtained (for example, when an optical disk without a predetermined protective layer is mounted in the optical disk device, the optical disk device does not allow the magnetic head 3 to be put into the recording and reproducing mode 3a), so that malfunctions and damage to an optical disk and the optical disk device can be prevented.

Furthermore, the optical disk device described above in Embodiments 1 and 2 is configured so that the magnetic head 3 is operated only in two positions defined by the recording and reproducing mode 3a and the cartridge insertion mode 3c. However, the magnetic head 3 may have a configuration in which the magnetic head 3 can be operated also in the reproducing mode 3b shown in FIGS. 3A and 3B. In this case, with respect to the optical disks 22 and 23 of the present invention as described in Embodiments 1 and 2 (shown in FIGS. 1B and 2A), the magnetic head 3 is operated only in two operation modes, i.e. the recording and reproducing mode 3a and the cartridge insertion mode 3c.

Further in this case, with respect to the conventional magneto-optical disks 61 and 62, the magnetic head 3 is operated in three operation modes, i.e. the recording mode 3a, the reproducing mode 3b, and the cartridge insertion mode 3c. According to this configuration, with respect to the optical disks 22 and 23 of the present invention, a high-speed seek also can be performed during reproduction. Further, according to this configuration, with respect to the conventional magneto-optical disks 61 and 62, recording and reproducing operations can be performed with the magnetic head held in the same positions as in the case of the conventional optical disk device. Identification data regarding whether an optical disk that has been mounted in the optical disk device is of the optical disks 22 and 23 of the present invention or the conventional magneto-optical disks 61 and 62 can be recorded on a cartridge or the disk in the same manner as in the aforementioned case of recording the identification data regarding the protective layer.

Furthermore, in Embodiments 1 and 2 described above, a detecting unit may be provided that detects a floating or sliding state of the magnetic head 3 when the magnetic head 3 is in the recording and reproducing mode 3a. The floating or sliding state of the magnetic head 3 can be determined by, for example, detecting a force exerted on the magnetic head 3 by a rotating optical disk. The force can be detected by using, for example, a so-called load sensor (such as a load sensor utilizing a piezoelectric element) provided in an arm portion for holding the magnetic head 3. Variation in the floating or the sliding state causes the force exerted on the magnetic head 3 by the optical disk to vary. The detecting unit constantly detects the force and transmits the result of the detection to a controlling unit. The controlling unit judges whether the floating or the sliding state is normal or not. For example, in an optical disk device having the magnetic head 3 of the sliding type, the magnetic head 3 is constantly subjected to a force (a frictional force) that is exerted by the optical disk in a peripheral direction of an optical disk. The force is substantially constant in a normal state. However, when damage is caused in a sliding member of the magnetic head 3 or a sliding surface (a protective layer) of the optical disk, the frictional force is increased. When the frictional force has a value higher than a predetermined threshold value, the controlling unit judges that the sliding state is abnormal. Further, in an optical disk device having the magnetic head 3 of the floating-type, the magnetic head 3 hardly is subjected to a force exerted by an optical disk when the magnetic head 3 is in the floating state as a normal state. However, when the floating state cannot be maintained stably for any reason, the magnetic head 3 is brought into contact with the optical disk, so that the magnetic head 3 is subjected to a frictional force exerted by the optical disk. When the frictional force has a value higher than the predetermined threshold value, or when the frictional force is detected a predetermined number of times (or with a predetermined frequency), the controlling unit judges that the floating state is abnormal. When the sliding or the floating state is judged to be abnormal, the controlling unit brings the sliding or the floating state of the magnetic head 3 (the recording and reproducing mode 3a) to a halt, and the magnetic head 3 is put into, for example, the cartridge insertion mode 3c. The controlling unit further may stop the rotation of the optical disk and allow the optical disk to be ejected. Further, in addition to this operation, or instead of performing this operation, a warning for warning a user of abnormality (for example, an abnormality warning sign or a warning sound) may be given. According to the aforementioned configuration, damage to an optical disk that results in inability to reproduce recorded information and damage to an optical disk device can be prevented.

The embodiments disclosed in this application are intended to illustrate the technical aspects of the invention and not to limit the invention thereto. The invention may be embodied in other forms without departing from the spirit and the scope of the invention as indicated by the appended claims and is to be broadly construed.

The invention claimed is:

1. An optical disk device comprising a floating-type or a sliding-type magnetic head and an optical head, the optical disk device performing recording and/or reproduction with respect to a magnetic field modulation type magneto-optical disk, a read-only disk, and an optical disk comprising an optical disk substrate of a predetermined thickness having a light incidence surface on one face, in which at least a pit information surface and a protective layer are formed in this order on a side of the other face opposed to the light incidence surface, wherein the protective layer is a protective layer that is used in a magnetic field modulation type magneto-optical disk and formed of an ultraviolet curable resin layer coated with a silicone oil, wherein the magnetic head is retracted when mounting the magneto-optical disk, the read-only disk, and the optical disk, the magnetic head is separated from the read-only optical disk when performing reproduction with respect to the read-only optical disk, and the magnetic head is allowed to slide or float when performing recording and reproduction with respect to the magneto-optical disk and the optical disk.

2. An optical disk device comprising a floating-type or a sliding-type magnetic head and an optical head, the optical disk device performing recording and/or reproduction with respect to a magnetic field modulation type magneto-optical disk, a read-only optical disk, and an optical disk comprising an optical disk substrate of a predetermined thickness having a light incidence surface on one face, in which at least a pit information surface and a protective layer are formed in this order on a side of the other face opposed to the light incidence surface, wherein the protective layer is a protective layer that is used in a magnetic field modulation type magneto-optical disk and formed of an ultraviolet curable resin layer coated with a silicone oil, wherein the magnetic head is retracted when mounting the magneto-optical disk, the read-only optical disk, and the optical disk, the magnetic head is separated from the magneto-optical disk and the read-only optical disk when performing reproduction with respect to the magneto-optical disk and the read-only optical disk, respectively, and the magnetic bead is allowed to slide or float when performing recording with respect to the magneto-optical disk and recording and reproduction with respect to the optical disk.

3. An optical disk device comprising a floating-type or a sliding-type magnetic head and an optical head, the optical disk device performing recording and/or reproduction with respect to a magnetic field modulation type magneto-optical disk, a read-only optical disk, and a partially recorded optical disk comprising an optical disk substrate of a predetermined thickness having a light incidence surface on one face, in which at least a layer, divided into a pit information surface region and a magneto-optical recording surface region, and a protective layer are formed in this order on a side of the other face opposed to the light incidence surface, wherein the protective layer is a protective layer that is used in a magnetic field modulation type magneto-optical disk and formed of an ultraviolet curable resin layer coated with a silicone oil, wherein the magnetic head is retracted when mounting the magneto-optical disk, the read-only optical disk, and the partially recorded optical disk, the magnetic head is separated from the read-only optical disk when performing reproduction with respect to the read-only optical disk, and the magnetic head is allowed to slide or float when performing recording and reproduction with respect to the magneto-optical disk and the partially recorded optical disk.

4. An optical disk device comprising a floating-type or a sliding-type magnetic head and an optical head, the optical disk device performing recording and/or reproduction with respect to a magnetic field modulation type magneto-optical disk, a read-only optical disk, and a partially recorded optical disk comprising an optical disk substrate of a predetermined thickness having a light incidence surface on one face, in which at least a layer, divided into a pit information surface region and a magneto-optical recording surface region, and a protective layer are formed in this order on a side of the other face opposed to the light incidence surface, wherein the protective layer is a protective layer that is used in a magnetic field modulation type magneto-optical disk and formed of an ultraviolet curable resin layer coated with a silicone oil, wherein the magnetic head is retracted when mounting the magneto-optical disk, the read-only optical disk, and the partially recorded optical disk, the magnetic head is separated from the magneto-optical disk and the read-only optical disk when performing reproduction with respect to the magneto-optical disk and the read-only optical disk, respectively, and the magnetic head is allowed to slide or float when performing recording with respect to the magneto-optical disk and recording and reproduction with respect to the partially recorded optical disk.

5. The optical disk device according to claim 1 wherein a printing layer is formed between the pit information surface and the protective layer.

6. The optical disk device wording to claim 2 wherein a printing layer is formed between the pit information surface and the protective layer.

7. The optical disk device according to claim 3 wherein a printing layer is formed between the magneto-optical recording surface region and the protective layer.

8. The optical disk device according to claim 4 wherein a printing layer is formed between the magneto-optical recording surface region and the protective layer.

9. An optical disk with respect to which recording and/or reproduction are (is) performed by the optical disk device according to claim 1, wherein the optical disk is a read-only optical disk comprising an optical disk substrate of a predetermined thickness having a light incidence surface on one face, in which at least a pit information surface and a protective layer are formed in this order on a side of the other face opposed to the light incidence surface, and the protective layer is a protective layer that is used in a magnetic field modulation type magneto-optical disk and formed of an ultraviolet curable resin layer coated with a silicone oil.

10. The optical disk according to claim 9, wherein a printing layer is provided between the pit information surface and the protective.

11. An optical disk with respect to which recording and/or reproduction are (is) performed by the optical disk device according to claim 1, wherein the optical disk is a magnetic field modulation type magneto-optical disk comprising an optical disk substrate of a predetermined thickness having a light incidence surface on one face, in which at least a magneto-optical recording surface, a printing layer, and a protective layer are formed in this order on a side of the other face opposed to the light incidence surface, and the protective layer is a protective layer that is used in a magnetic field modulation type magneto-optical disk and formed of an ultraviolet curable resin layer coated with a silicone oil.

12. An optical disk with respect to which recording and/or reproduction are (is) performed by the optical disk device according to claim 2, wherein the optical disk is a read-only optical disk comprising an optical disk substrate of a predetermined thickness having a light incidence surface on one face, in which at least a pit information surface and a protective layer are formed in this order on a side of the other face opposed to the light incidence surface, and the protective layer is a protective layer that is used in a magnetic field modulation type magneto-optical disk and formed of an ultraviolet curable resin layer coated with a silicone oil.

13. The optical disk according to claim 12, wherein a printing layer is provided between the pit information surface and the protective.

14. An optical disk with respect to which recording and/or reproduction are (is) performed by the optical disk device according to claim 2, wherein the optical disk is a magnetic field modulation type magneto-optical disk comprising an optical disk substrate of a predetermined thickness having a light incidence surface on one face, in which at least a magneto-optical recording surface, a printing layer, and a protective layer are formed in this order on a side of the other face opposed to the light incidence surface, and the protective layer is a protective layer that is used in a magnetic field modulation type magneto-optical disk and formed of an ultraviolet curable resin layer coated with a silicone oil.

15. An optical disk with respect to which recording and/or reproduction are (is) performed by the optical disk device according to claim 3, wherein the optical disk is a partially recorded optical disk comprising an optical disk substrate of a predetermined thickness having a light incidence surface on one face, in which at least a layer, divided into a pit information surface region and a magneto-optical recording surface region, and a protective layer are formed in this order on a side of the other face opposed to the light incidence surface, and the protective layer is a protective layer that is used in a magnetic field modulation type magneto-optical disk and formed of an ultraviolet curable resin layer coated with a silicone oil.

16. The optical disk according to claim 15,
wherein a printing layer is provided between the protective layer and the layer divided into the pit information surface region and the magneto-optical recording surface region.

17. An optical disk with respect to which recording and/or reproduction are (is) performed by the optical disk device according to claim 3,
wherein the optical disk is a magnetic field modulation type magneto-optical disk comprising an optical disk substrate of a predetermined thickness having a light incidence surface on one face, in which at least a magneto-optical recording surface, a printing layer, and a protective layer are formed in this order on a side of the other face opposed to the light incidence surface, and
the protective layer is a protective layer that is used in a magnetic field modulation type magneto-optical disk and formed of an ultraviolet curable resin layer coated with a silicone oil.

18. An optical disk with respect to which recording and/or reproduction are (is) performed by the optical disk device according to claim 4,
wherein the optical disk is a partially recorded optical disk comprising an optical disk substrate of a predetermined thickness having a light incidence surface on one face, in which at least a layer, divided into a pit information surface region and a magneto-optical recording surface region, and a protective layer are formed in this order on a side of the other face opposed to the light incidence surface, and
the protective layer is a protective layer that is used in a magnetic field modulation type magneto-optical disk and formed of an ultraviolet curable resin layer coated with a silicone oil.

19. The optical disk according to claim 18,
wherein a printing layer is provided between the protective layer and the layer divided into the pit information surface region and the magneto-optical recording surface region.

20. An optical disk with respect to which recording and/or reproduction are (is) performed by the optical disk device according to claim 4,
wherein the optical disk is a magnetic field modulation type magneto-optical disk comprising an optical disk substrate of a predetermined thickness having a light incidence surface on one face, in which at least a magneto-optical recording surface, a printing layer, and a protective layer are formed in this order on a side of the other face opposed to the light incidence surface, and
the protective layer is a protective layer that is used in a magnetic field modulation type magneto-optical disk and formed of an ultraviolet curable resin layer coated with a silicone oil.

21. The optical disk according to any one of claims 9 to 20, wherein recording and/or reproduction are (is) performed by an optical disk device that performs recording and/or reproduction with respect to the magnetic field modulation type magneto-optical disk.

22. The optical disk according to any one of claims 9 to 20, wherein the optical disk is housed in an optical disk cartridge having an opening that exposes the light incidence surface and the surface of the protective layer.

23. The optical disk according to any one of claims 9 to 20, wherein identification data regarding the protective layer is recorded on the optical disk.

24. The optical disk according to claim 22, wherein identification data regarding the protective layer is recorded on the optical disk cartridge.

* * * * *

UNITED STATES PATENT AND TRADEMARK OFFICE
CERTIFICATE OF CORRECTION

PATENT NO. : 7,196,975 B1
APPLICATION NO. : 10/089409
DATED : March 27, 2007
INVENTOR(S) : Aikoh et al.

It is certified that error appears in the above-identified patent and that said Letters Patent is hereby corrected as shown below:

Column 20, line 57(claim 2): "magnetic bead" should read --magnetic head--.
Column 21, line 49(claim 6): "wording to claim 2" should read --according to claim 2--.
Column 22, line 7(claim 10): "and the protective." should read --and the protective layer.--.
Column 22, line 40(claim 13): "and the protective." should read --and the protective layer.--.

Signed and Sealed this

Eighteenth Day of September, 2007

JON W. DUDAS
*Director of the United States Patent and Trademark Office*